J. G. GREEN & V. A. HENRY.
GLASS CUTTING TABLE.
APPLICATION FILED APR. 28, 1908. RENEWED MAY 7, 1909.
935,014.
Patented Sept. 28, 1909.
2 SHEETS—SHEET 1.
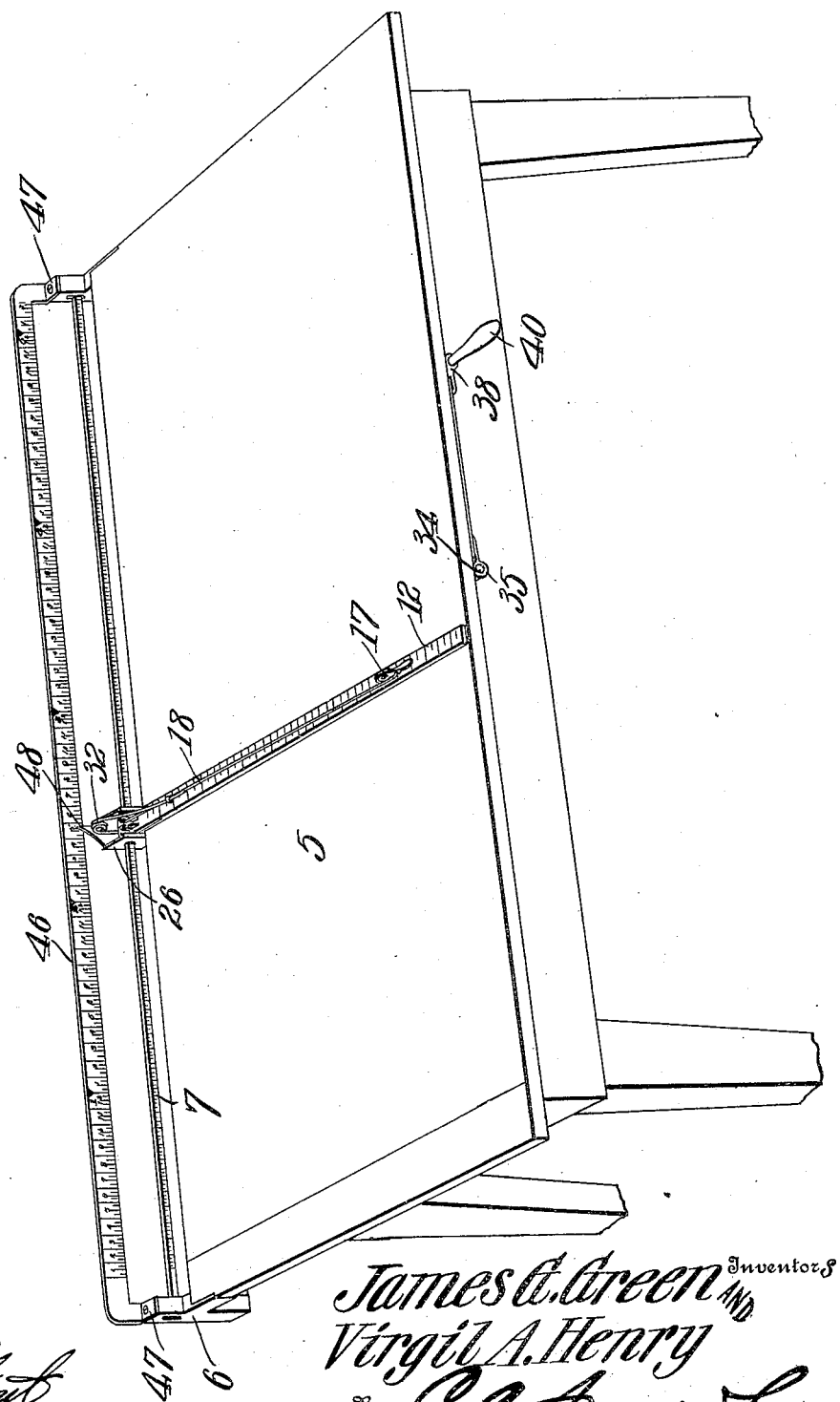

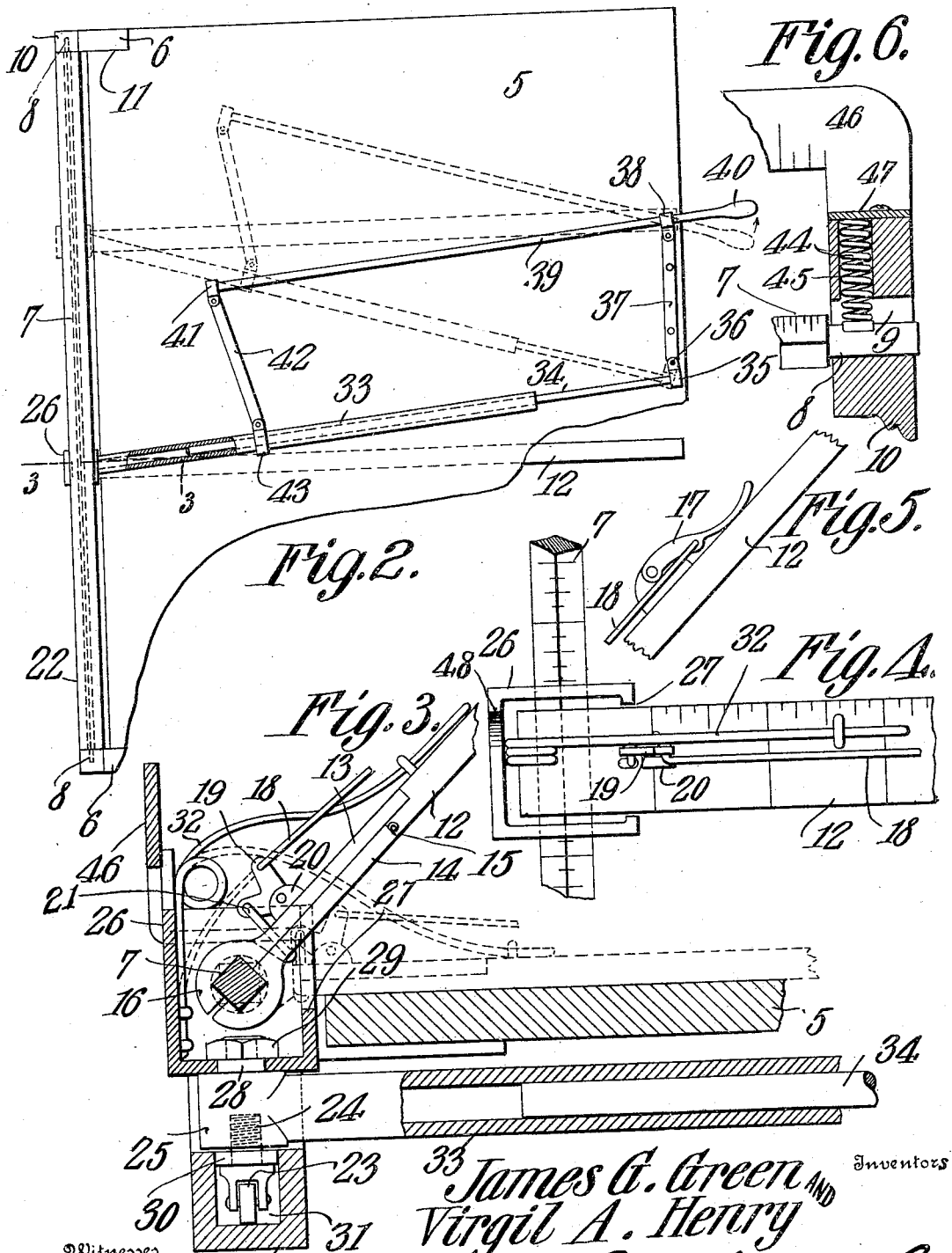

UNITED STATES PATENT OFFICE.

JAMES GRAHAM GREEN AND VIRGIL A. HENRY, OF COLORADO SPRINGS, COLORADO.

GLASS-CUTTING TABLE.

935,014.　　　　　　　　Specification of Letters Patent.　　Patented Sept. 28, 1909.

Application filed April 28, 1908, Serial No. 429,702. Renewed May 7, 1909. Serial No. 494,587.

*To all whom it may concern:*

Be it known that we, JAMES GRAHAM GREEN and VIRGIL A. HENRY, citizens of the United States, residing at Colorado Springs, in the county of El Paso, State of Colorado, have invented a new and useful Glass-Cutting Table, of which the following is a specification.

This invention relates to glass cutting tables of that general class shown and described in United States Letters Patent issued to me on the 24th day of October 1905, under No. 802633.

The object of the invention is to improve and simplify the construction of the table and to provide means for adjusting the straight edge longitudinally of the table from the front edge of the latter.

A further object is to provide a system of levers disposed beneath the table and operatively connected with the straight edge, one of said levers being extended beyond the table to form an operating handle so that by manipulating said handle the straight edge may be moved to different positions of adjustment on the graduated guide bar.

A still further object of the invention is generally to improve this class of devices so as to increase their utility, durability and efficiency.

Further objects and advantages will appear in the following description, it being understood that various changes in form, proportions and minor details of construction may be resorted to within the scope of the appended claims.

In the accompanying drawings forming a part of this specification: Figure 1 is a perspective view of a glass cutting table constructed in accordance with my invention. Fig. 2 is a bottom plan view of the same. Fig. 3 is a transverse sectional view taken on the line 3—3 of Fig. 2. Fig. 4 is a top plan view of the straight edge and its associated parts. Fig. 5 is a side elevation of a portion of the straight edge. Fig. 6 is a vertical sectional view of one of the corner brackets or castings.
Similar numerals of reference indicate corresponding parts in all of the figures of the drawings.

The cutting board or table 5, which may be of any desired shape and formed of wood, metal or other suitable material, is provided at its rear longitudinal edge with corner brackets or castings 6 in which is journaled a graduated bar or rod 7, the latter being preferably angular in cross section and provided with terminal trunnions 8 which engage elongated slots or openings 9 formed in the vertical extensions 10 of said brackets, as shown. The brackets 6 are provided with integral laterally extending wings which engage suitable recesses 11 in the face of the table so as to present a smooth even surface to the glass to be cut and also to form an additional means for securing the brackets to the table or board. The bar 7 is preferably graduated to inches and fractions thereof, as shown, and slidably mounted on said bar is a rule or straight edge 12 also preferably graduated to inches and fractions thereof so that the operator may determine at a glance the exact length and width of glass to be cut without resorting to the use of auxiliary rules and similar measuring devices.

Secured to one end of the rule or straight edge is a clamping member preferably formed in two sections 13 and 14, the section 13 being riveted or otherwise rigidly secured to the rule, while the section 14 is pivoted or hinged thereto, as indicated at 15, whereby when the clamp is operated the angular sockets 16 of the clamping sections will engage the bar 7 and effectively retain the rule or straight edge in adjusted position. The clamping member is operated to engage the bar 7 by means of a hand lever 17 to the intermediate portion of which is secured one end of a rod or cable 18, the opposite end of the rod being secured to a bell crank lever 19 pivotally mounted in a suitable bracket 20 secured to the clamp section 13. Secured to the other arm of the bell crank lever 19 is a short rod section 21, the latter being operatively connected with the clamp section 14 so that by operating the lever 17, the bell crank lever, through the medium of the rod 18, will clamp the sections 13 and 14 in engagement with the guide rod 7.

Disposed parallel with the rear longitudinal edge of the cutting table and preferably supported beneath the same by the brackets 6 is a longitudinal channel bar 22 in which is mounted for rotation a wheel or pulley 23. The wheel or pulley 23 is provided with a vertically disposed shank 24, which latter is threaded in a block or swivel member 25 mounted for longitudinal movement on the channel bar 22. Mounted on the swivel member 25 is a box or casing 26 having oppositely disposed elongated openings formed therein for the reception of the graduated bar 7 and which forms a housing for the fixed end of the straight edge 12, there being a vertically disposed recess 27 formed in one wall of the casing 26 to permit vertical movement of the straight edge, as best shown in Fig. 3 of the drawings. The swivel member 25 is provided with a cylindrical extension 28 which is journaled in a correspondingly shaped opening formed in the bottom of the casing 26, said extension being provided with terminal threads for engagement with the clamping nut 29, whereby the box is held in position on the swivel member while at the same time permitting movement of one relative to the other. An anti-friction roller 30 is preferably journaled on the shank 24 with its peripheral edge bearing against the interior walls of the longitudinal chamber 31 of the channel bar thereby to reduce friction between the parts when the straight edge is adjusted longitudinally of the table. Secured to one of the interior walls of the casing 26 is the adjacent end of a spring 32, the opposite end of the spring being fastened in any suitable manner to the straight edge 12 thereby to normally and yieldably support the free end of the straight edge in elevated position above the table so as to permit the glass to be readily positioned thereon.

As a means for adjusting the straight edge longitudinally of the table there is provided a tubular member 33 preferably formed integral with and extending laterally from the swivel 25, said tubular member being disposed beneath the cutting table and terminating short of the front edge thereof, as shown. Slidably mounted in the tubular member 33 is a rod 34 having its outer end extended through a clamping member 35. The clamping member 35 is pivotally mounted at 36 on a bar 37 rigidly secured to the bottom of the table 5, there being a similar clamping member 38 pivotally mounted on the opposite end of the bar 37 and in which is mounted a rod 39. One end of the rod 39 is provided with an operating handle 40 while the opposite end thereof is secured to a clamping member 41 similar in construction to the clamping members 35 and 38. The clamping member 41 is connected through the medium of a link 42 with a clamping member or clip 43 carried by the tubular member 33 so that by moving the free end of the handle 40 toward either end of the table the straight edge will be moved longitudinally of the table to any desired position of adjustment, the swivel connection between the casing 26 and tubular member 33 permitting said adjustment without danger of binding or wedging action between the parts. In order to adapt the device for cutting glass of different thicknesses the bar 7 is preferably yieldably supported in the slots 9 by suitable springs 44 disposed in recesses 45 in the corner brackets 6 and bearing against the trunnions 8 of said bars so as to normally hold the latter depressed. It will thus be seen that the bar 7 is capable of both rotary and vertical movement and that the straight edge being carried by the bar will also be elevated with the latter.

Disposed at the rear longitudinal edge of the table and arranged above the graduated bar 7 is an auxiliary bar 46, the latter being provided with graduations indicating inches and feet and fractions thereof, said bar being formed with terminal offset ears 47 for attachment to the corner brackets 6, as shown.

Secured to the rear portion of the box or casing 26 is a pointer 48 which travels over the graduated surface of the box 46 as the straight edge is moved to different positions of adjustment on the table and indicates the width of the glass to be cut.

In operation the glass is placed in position on the table and the straight edge adjusted longitudinally of the latter until the pointer registers with the desired graduation on the bar 46, this adjustment of the straight edge being effected by tilting the handle 40 in the manner before stated. The sections 13 and 14 are then clamped in engagement with the guide bar 7 by manipulating the lever 17 after which the straight edge is forced downwardly into engagement with the glass against the tension of the spring 32. After the glass has been cut or severed the free end of the straight edge is released which causes the spring 32 to elevate the same above the table so that another pane of glass may be readily placed in position on said table. It will thus be seen that by manipulating the handle 40 the straight edge may be moved to different positions of adjustment on the graduated bar from the front edge of the table and without the necessity of manually handling the straight edge.

Having thus described the invention what is claimed is:

1. The combination with a board or table, of a guide member, a straight edge slidably mounted on the guide member, and means pivotally connected with the straight edge for effecting the adjustment of the straight edge on said guide member.

2. The combination with a board or table, of a guide member, a straight edge slidably mounted on the guide member and movable to operative position substantially parallel with the table, vibratory means operatively connected with the straight edge for effecting the adjustment of the latter, and means for automatically elevating the free end of the straight edge when the latter is released.

3. The combination with a board or table, of a vertically movable guide member disposed at one edge of the table, a straight edge slidably mounted on the guide member, and means disposed at the opposite edge of the table and operatively connected with the straight edge for adjusting the latter longitudinally of the table.

4. The combination with a board or table, of a grooved bar disposed at one edge of the table, a guide bar disposed in spaced relation to the grooved bar, a casing surrounding the guide bar, a straight edge secured to the bar and said casing and movable to operative position in substantially parallel relation to the table, an anti-friction roller operating in the groove of the bar, a swivel connection in the roller and casing, and means carried by the swivel for adjusting the straight edge longitudinally of the table.

5. The combination with a board or table, of a channel bar secured to one edge of the table, a roller mounted in the channel bar, a graduated guide bar spaced from the channel bar, a casing surrounding the guide bar, a swivel connection between the casing and roller, a straight edge secured to the bar at said casing, means for yieldably supporting the straight edge in elevated position above the table, and means disposed beneath the table and operatively connected with the swivel for adjusting the straight edge longitudinally of the table.

6. The combination with a board or table, of a guide bar, a casing surrounding the guide bar and provided with a vertically disposed slot, a straight edge disposed within the casing at said slot and operatively connected with the guide bar, a swivel depending from the casing, and means carried by the swivel and extending beneath the table for adjusting the straight edge longitudinally of said table.

7. The combination with a board or table, of a channel bar depending from one edge of the table, a graduated guide bar disposed in spaced relation to the channel bar, a casing surrounding the guide bar, a roller journaled in the channel bar, a swivel connection between the casing and roller, a straight edge disposed within the casing and operatively connected with the guide bar, and a system of levers operatively connected with the swivel and extending beneath the table for adjusting the straight edge longitudinally of said table.

8. The combination with a board or table, of a channel bar depending from one longitudinal edge of the table, a graduated bar spaced from the channel bar, a casing surrounding the graduated bar, a roller journaled in the channel bar, a swivel connection between the roller and casing, a straight edge arranged within the casing and having means for engagement with the guide bar, means for yieldably supporting the guide bar in operative position, a spring connecting the casing and straight edge for normally supporting the latter in elevated position, and means operatively connected with the swivel and extending beneath the table for adjusting the straight edge longitudinally of the latter.

9. The combination with a board or table, of a channel bar, a graduated guide bar spaced from the channel iron, a casing surrounding the guide bar, a roller mounted for rotation in the channel bar, a swivel connection between the casing and roller, a straight edge disposed within the casing, means for clamping the straight edge in engagement with the guide bar, a tubular member secured to the swivel, a rod slidably mounted in the tubular member, an operating rod spaced from the tubular member and provided with a terminal handle, and a connection between the operating rod and the tubular member and sliding rod, respectively.

10. The combination with a board or table, of a channel bar secured to one edge of the table, a graduated bar spaced from the channel bar, a casing surrounding the guide bar, a roller mounted for rotation in the channel bar, a swivel connection between the casing and roller, a straight edge disposed within the casing and slidably mounted on the guide bar, means for yieldably supporting the straight edge in elevated position above the table, a support rigidly secured to the bottom of the table and provided with oppositely disposed pivoted clamping members, a tubular member secured to the swivel, a rod slidably mounted in the tubular member and extended through the adjacent clamping member at the bottom of the table and extending through the adjacent clamping member on the support, an operating rod extending through the opposite clamping member and provided with a terminal handle projecting beyond the opposite edge of the table, and a link connection between the handle carrying rod and tubular member.

11. The combination with a board or table, of a vertically movable yieldably supported guide member, a casing slidably mounted on the guide member, a straight edge carried by the casing and movable to operative position substantially parallel with the table, means disposed beneath the table and operatively connected with the straight edge for effecting the adjustment of the casing, a graduated bar extending above the table, and a pointer secured to the casing and movable over the surface of the graduated bar.

In testimony that we claim the foregoing as our own, we have hereto affixed our signatures in the presence of two witnesses.

JAMES GRAHAM GREEN.
VIRGIL A. HENRY.

Witnesses:
ROBERT D. SIMS,
ARCHIBOLD J. GILLIS.